United States Patent [19]

Van Schoiack et al.

[11] Patent Number: 4,752,732
[45] Date of Patent: Jun. 21, 1988

[54] ANGULAR DISPLACEMENT SENSOR

[75] Inventors: Michael M. Van Schoiack, Bellevue; Patrick H. Mawet, Everett, both of Wash.

[73] Assignee: Baker-Hughes, Houston, Tex.

[21] Appl. No.: 711,982

[22] Filed: Mar. 14, 1985

[51] Int. Cl.$^4$ .............................................. G01B 7/14
[52] U.S. Cl. ...................................... 324/208; 324/236
[58] Field of Search ............... 324/207, 208, 236, 220, 324/164, 163, 176; 340/870.31, 870.32, 870.33, 870.34, 870.35

[56] References Cited

U.S. PATENT DOCUMENTS

| | | | |
|---|---|---|---|
| 2,957,127 | 10/1960 | Wright | 324/207 |
| 4,059,015 | 11/1979 | Satori | 340/870.31 X |
| 4,164,706 | 8/1979 | Akita et al. | 324/208 |
| 4,401,946 | 8/1983 | Klimstra | 324/208 |
| 4,604,575 | 8/1986 | Shimizu et al. | 324/208 |

FOREIGN PATENT DOCUMENTS

| | | | |
|---|---|---|---|
| 2420166 | 11/1975 | Fed. Rep. of Germany | 324/208 |
| 8201178 | 7/1983 | Netherlands | 324/208 |

Primary Examiner—Reinhard J. Eisenzopf
Assistant Examiner—Robert W. Mueller
Attorney, Agent, or Firm—Burns, Doane, Swecker & Mathis

[57] ABSTRACT

A rotational displacement sensor includes a pair of coils stationarily mounted adjacent a rotatable cam formed of a metallic material. The coils are energized by high frequency alternating current. A differential amplifier is connected to the coils such that the output of the amplifier is linearly proportional to the rotational angular displacement of the cam relative to the coils.

4 Claims, 2 Drawing Sheets

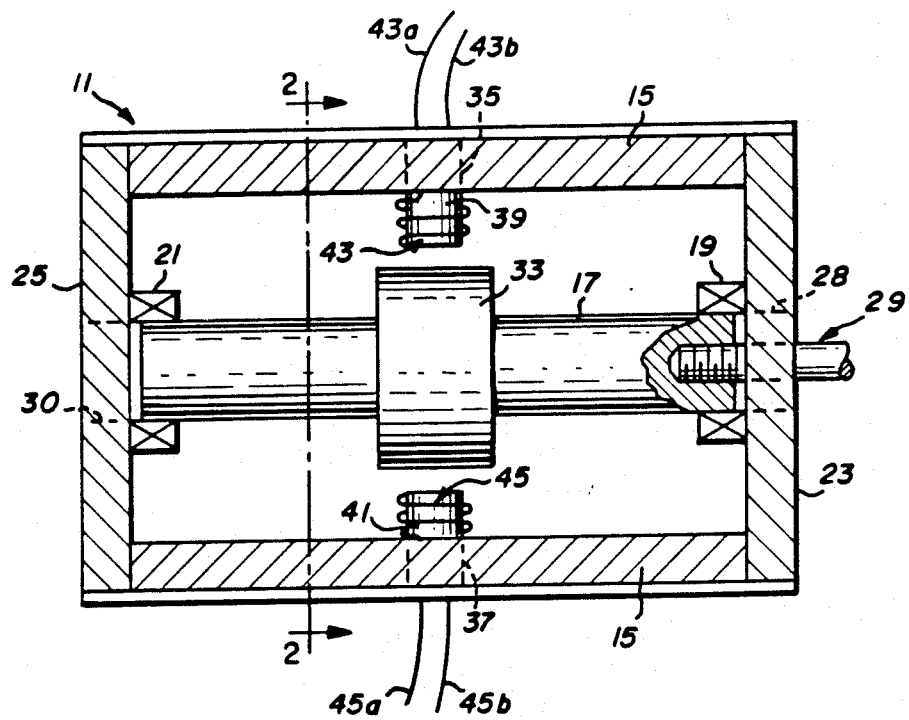
Fig_1
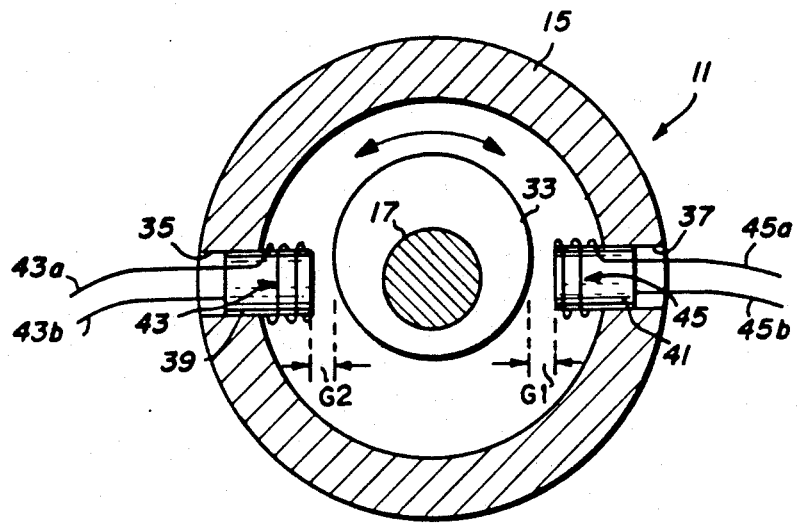
Fig_2

ANGULAR DISPLACEMENT SENSOR

BACKGROUND OF THE INVENTION

1. Field of the Invention

The present invention relates to an apparatus for sensing the angular displacement, or extent of partial rotation, of a member and more particularly to such a sensing apparatus which utilizes electrical inductance as the technique for sensing angular displacment.

2. Description of the Prior Art

In various applications it is desirable to monitor the angular displacement of a first object which is rotatably positioned relative to a second object. For example, it is desirable to sense the angular displacement of various components of road grading or paving machines so that the completed roadway has the desired height above a reference such as a string line or existing pavement. In other machinery, as well, it is necessary or desirable to monitor whether one component has moved angularly relative to a second component in order, for instance, to provide a control function to maintain the components level or at a desired angular displacement relative to one another.

The determination of angular displacement is relatively more sensitive and complex than the monitoring of revolutions of a rotating shaft or the like, which is normally accomplished by a tachometer. Furthermore, in the abovementioned applications, it is necessary that the angular displacement sensor be rugged and reliable, yet capable of sensing relatively fine changes in relative angular positioning. Further, because positional adjustments may be based upon the sensed angular displacement, it is most desirable that the output of the sensor be linearly related to the angular position; such linearity ordinarily substantially simplifies any adjustments which must be made to restore, for example, a level relationship.

In the prior art, it is known to sense angular displacements with potentiometric sensors, inductive displacement transducers (such as rotary variable differential transformers), and induction potentiometers. The prior art sensors based upon potentiometric measurements, while accurate, frequently prove to be unreliable because of the unavoidable frictional engagement between a wiper element and a resistive element. Likewise, conventional inductive sensors are usually expensive and difficult to calibrate; for example, inductive displacement transducers utilizing rotary variable differential transformers employ complex rotating parts and a multiplicity of coils which can cause complications in calibration.

OBJECTS AND SUMMARY OF THE PRESENT INVENTION

A primary object of the present invention is to provide an accurate sensor for detecting relative angular displacements, which sensor is simple and rugged of design.

More particularly, an object of the present invention is to provide an accurate sensor for detecting relative angular displacement, which sensor provides low frictional resistance to angular displacements and has stable outputs over a wide temperature range.

Yet another object of the present invention is to provide an accurate sensor for detecting angular displacement, which sensor provides output signals which are linear with regard to the degrees of angular displacement over a wide range around the displacement or null point.

In accordance with the preceding objects, the present invention provides a rotational displacement sensor comprising a shaft mounted for rotation about its longitudinal axis within a housing, means for connecting the shaft to an element capable of angular displacement relative to the housing, a metallic cam-like member fixedly mounted eccentrically to the shaft member for rotation within the housing, first and second coil means fixedly mounted in the housing generally opposite one another with the sides of the cam-like member equidistantly spaced from the respective coil means when said cam-like member is in a non-displaced angular position, means to concurrently energize both coils of the pair with alternating electrical current, and means to provide a signal related to the difference in the potential across one of the coils of the pair relative to the potential across the other coil of the pair, which signal is generally linearly indicative of the angular displacement of the cam-like member relative to the housing when the pair of coil means is energized with alternating electrical current.

In accordance with the preceding, an advantage of the present invention is the provision of an accurate sensor for detecting angular displacements, which sensor is of simple and rugged design.

Another advantage of the present invention is the provision of an accurate sensor for detecting angular displacements, which sensor provides low frictional resistance to angular displacements and has stable outputs over a wide temperature range.

Still another advantage of the present invention is the provision of an accurate sensor for detecting angular displacement, which sensor provides output signals which are generally linear with regard to the degrees of angular displacement over a wide range around the zero-displacement point.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a side view, in section and partially cutaway for purposes of explanation, of a rotational displacement sensor according to the present invention;

FIG. 2 is a cross-sectional view taken along line 2—2 of FIG. 1 for viewing in the direction of the arrows;

DETAILED DESCRIPTION OF THE PREFERRED EMBODIMENT

Figure 3:
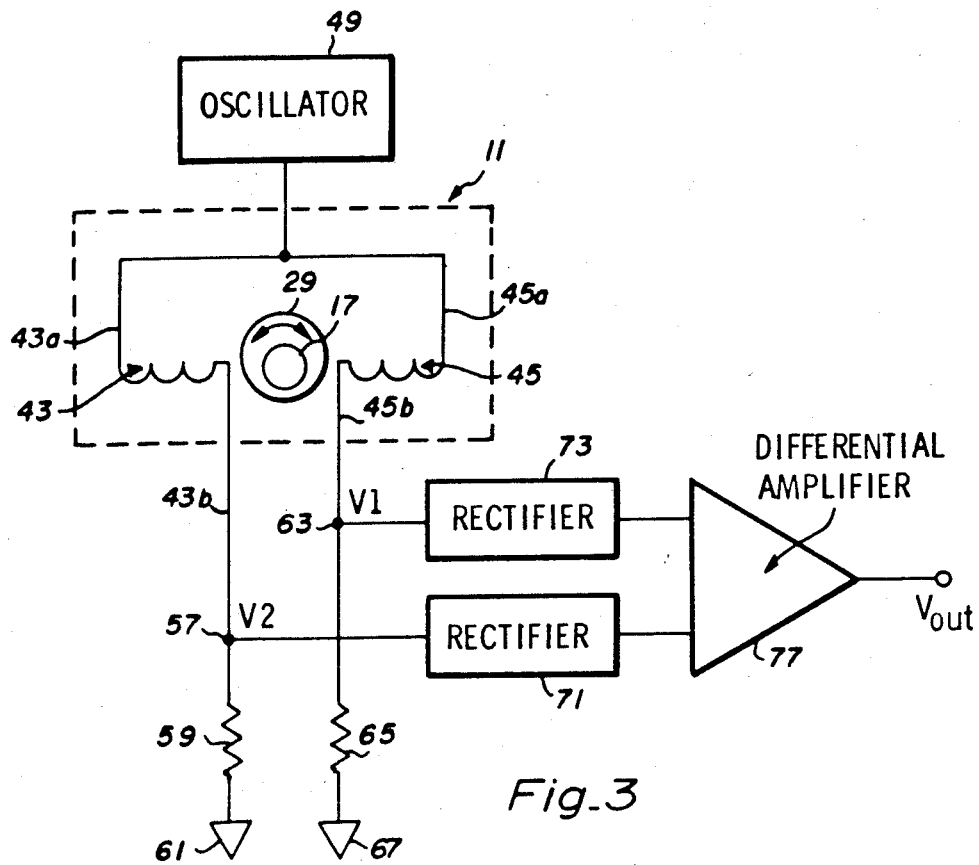
FIG. 3 is a functional diagram of an electrical system for use with the rotational displacement sensor of FIG. 1.

As shown in FIGS. 1 and 2, a rotational displacement sensor 11 generally includes a stationarily-fixed cylindrical housing 15 wherein a shaft member 17 is generally coaxially disposed and mounted for rotation about its longitudinal axis. In the illustrated embodiment, such rotatable mounting is provided by supporting the shaft member 17 on bearing sets 19 and 21 fixed to the respective circular end members 23 and 25 of the housing.

In the preferred embodiment, an aperture 28 is formed centrally through the end member 23 so that the shaft member 17 may be connected to an element 29 which causes angular displacement of the shaft relative to the fixed housing. A typical such element could be an arm whose angular position represents the displacement of a hydraulic cylinder on a road paving mechanism. Connection of this or other rotatable elements to the shaft 17 can be accomplished in various other equivalent ways. As an example of one alternative, the shaft member 17 could be held relatively stationary and the housing 15 could be allowed to move angularly relative to the shaft.

According to the present invention, a metallic cam-like member 33 is fixedly mounted to the shaft member 17 for rotation with the shaft within the housing 15. In its preferred embodiment, the cam-like member 33 is circular in cross-section, and is mounted eccentrically to the shaft member 17 centrally within the housing. The cam-like member can be formed from any one of a number of conductive materials, including aluminum, iron and copper. Aluminum is the preferred material of construction of the cam-like member 33, however, because of its relative ease of machining.

Referring still to FIGS. 1 and 2, a pair of apertures 35 and 37 are formed diametrically opposite one another through the side wall of the cylindrical housing 15. Peg-like supporting members 39 and 41 are mounted within the respective apertures 35 and 37 to extend inward of the interior of the housing 15 in a generally diametric direction.

Further according to the present invention, a pair of substantially identical coil means 43 and 45 are disposed generally opposite one another in the housing. As shown in the drawings of FIGS. 1 and 2, the coil means are preferrably mounted on the respective supporting members 39 and 41. (The lead wires to the coil means 43 are designated as 43a and 43b, respectively; and the lead wires to the coil means 45 are designated by 45a and 45b, respectively.) More particularly, in the preferred embodiment, the coil means 43 and 45 are fixedly positioned on the supporting members 39 and 41 such that the sides of the cam-like member 33 are substantially equidistant from the respective coil means when the cam-like member is in a non-displaced angular position. In the non-displaced angular position of the cam-like member 33 shown in FIG. 2, a vertical plane through the centerline of the shaft 17 would divide the cam-like member 33 into symmetrical right and left halves. With the cam-like member 33 in such a symmetrical position between the coil means 43 and 45, the distance G2 between the coil 43 and the adjacent side of the cam-like member 33 is equal to the distance G1 between the right side of the cam-like member 29 and the coil 45. It should be noted that the distances G1 and G2 will change depending upon the angular displacement of the cam-like member 33 relative to the housing 15. Also, it should be noted that a condition of symmetry also exists when the cam-like member 33 is rotated 180° from the position shown in FIG. 2.

In the preferred embodiment of the present invention, each of the coil means 43 and 45 is formed as a helix about its associated support member 39 and 41. When so formed and oriented as shown in FIGS. 1 and 2, the axial centerlines of the two helixes are generally aligned with one another, and both centerlines approximately intersect the centerline of the shaft member 17. Other orientations of the coil means 43 and 45 can be utilized, however, so long as the sides of the cam-like member 33 are equidistantly spaced from the respective coil means when the cam-like member is in a non-displaced angular position.

Referring now to FIG. 3, a high frequency oscillator 49 is connected to the lead wires 43a and 45a to concurrently energize the associated coils 43 and 45 with alternating electrical current. (In practice, the oscillation frequency is about 6 MHz, but other frequencies can readily be employed.) The lead wire 43b of the coil 43 is connected, at node 57, to an impedance means 59 in series with ground 61. Similarly the lead wire 45b of the coil 45 is connected, at node 63, to an impedance means 65 in series with ground 67. In the preferred embodiment, the impedance means 59 and 65 are resistors and have the same value; however, it should be understood that the impedance means need not be purely resistive element.

As further shown in FIG. 3, a first rectifier 71 is connected at the node 57. Likewise, a second rectifier 73, substantially identical to the first rectifier, is connected at node 63. The output signals from the two rectifiers 71 and 73 are connected to a differential amplifier 77 which can be understood to be a conventional operational amplifier connected to provide an output, designated out in the drawing as $V_{out}$, representative of the difference in amplitude between the electrical outputs of the two rectifiers 71 and 73.

With the foregoing in mind, operation of the system of FIG. 3 can be readily understood. In practice, the oscillator 49 provides high frequency sinusoidally-alternating current which energizes the coil means 43 and 45 simultaneously. Upon such energization, each of the coil means 43 and 45 produces a time-varying magnetic field extending in a direction parallel to the axial centerline of the coil. That is, each of the coil means acts similarly to a solenoid and produces a magnetic flux directed parallel to its centerline; because the magnitude of the current through the coils varies with time, the resultant magnetic field also is time variant. The magnetic fields established by the respective coil means 43 and 45 will extend across the respective gaps G1 and G2 and will interact with the metallic cam-like member 29 thereby establishing eddy currents within the body of the member. So long as the sides of the cam-like member are spaced equally from the respective coils 43 and 45 (i.e., so long as gap G1 equals gap G2), the current and voltage conditions of the two coil means will be equal. Thus, under said conditions, the potential $V_2$ at node 57 will be equal to the potential $V_1$ at node 63, and the cam-like member 33 can be said to be in an electrically null position.

At this point, it should be appreciated that the voltage V2 at node 57 is equal to the voltage drop across the impedance means 59 which, in turn, is related to the voltage drop across the coil 43. (In theory, the sum of the potential drops across the coil 43 and the impedance means 59 would equal, at any instant, the potential applied by the oscillator 49.)

In the event that the cam-like member 33 rotates clockwise or counter-clockwise relative to the housing 23 to a position such that the gaps G1 and G2 are unequal, the electromagnetic field relationship between one of the coil means, say coil 43, and the cam-like member 33 will differ from the electromagnetic relationship between the other coil means 45 and the cam-like member 33. (More particularly, the magnitude of the current induced in the cam-like member 33 by a coil means will decrease when the distance between the cam-like member and the coil means increases.) As a result of these altered electromagnetic field conditions when the cam-like member 33 is angularly displaced from the null position, the voltage drop across the coil means 43 will differ from the voltage drop across the coil means 45. Accordingly, in such an angularly displaced position, the voltage across the impedance means 59 will differ from the voltage across the impedence means 65.

In practice, when the cam-like member 33 moves angularly clockwise from the electrical null position so that gap G1 is less than gap G2, the voltage across the coil means 45 will increase and the voltage across the coil means 43 will decrease; accordingly, under such conditions of clockwise angular displacement from the null position, the voltage at node 63 (equivalent to the voltage across the impedence means 65) will decrease in absolute value and the voltage at node 57 will increase. In other words, the voltage V2 will increase as the gap G2 increases and the voltage V1 will decrease as gap G1 decreases.

The differences in voltages across the impedance means 59 and 65, caused by clockwise or counter-clockwise angular displacement of the cam-like member 33, are compared by the rectifiers 71 and 73 in conjunction with the differential amplifier 77 of FIG. 3. More particularly, the rectifiers 73 and 71 operate upon the voltage signals at nodes 57 and 63 such that the outputs of the rectifiers represent the positive values of the respective voltages at any point in time. That is, the outputs of the rectifiers are DC voltages, whereas the input voltages to the rectifier will have generally sinusoidal-like wave forms which differ in amplitude and phase from the signals provided by the oscillator 49.

The differential amplifier 77 provides output signals which are directly proportional to the differences in value between the rectified voltages at nodes 57 and 63. (That is, the output of the differential amplifier 77 represents the value V2−V1.) The proportionality constant, or amplification, depends upon the gain through the amplifier 77.

Figure 4:
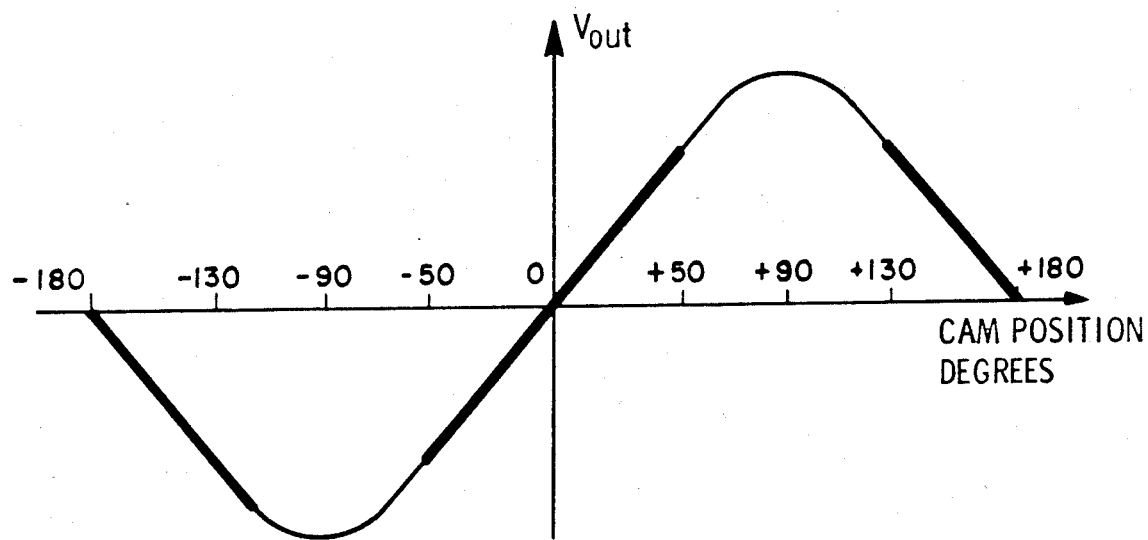
FIG. 4 is a graphical representation of an electrical output signal provided by the system of FIG. 3 during operation of the device of FIG. 1.

FIG. 4 depicts the output signals provided by the differential amplifier 77 as a function of the extent of angular displacement of the cam-like member 33 from the null (0°) position. Here again, the null point is the position where the distances between the coil means 43 and 45 and the adjacent sides of the cam-like member 33 are equal (i.e., where gap G1 equals gap G2). Positive degrees are measured by clockwise rotation of the cam-like member from the null position.

According to the present invention, the output signals from the differential amplifier 77 are generally linear over a range of rotational displacements of the cam-like members 33 from the electrical null position to about +50° or −50°. Likewise, the output signals from the differential amplifier 77 are substantially linear for the range from +130° to −130°. (The term "linear" denotes the fact that output voltages increase a constant amount for each degree of rotation clockwise from the null position.) Such linearity is important for control functions based upon the output of the differential amplifier. For example, a linear out signal can be utilized, after appropriate conditioning and calibration, to activate a mechanism which operates to provide a preselected angular relationship with an adjustably-movable components of a road paving machine.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A sensor for detecting limited angular displacements of a rotatable shaft and for providing output signals generally linearly related to the angular displacements comprising:

a stationary mounting means;

a shaft member mounted for free angular displacement about its longitudinal axis within the stationary mounting means;

a generally symmetrical member formed of an electrically conductive material fixed eccentrically to the shaft member for rotation therewith relative to the mounting means;

a single pair of coil means comprising first and second high-frequency coils mounted to the stationary mounting means generally opposite one another and spaced from the symmetrical member;

high-frequency oscillator means connected to concurrently energize the first and second coil means with high-frequency alternating current to produce eddy currents within the symmetrical member;

a first impedance means connecting the first coil member to ground, and a second impedance connecting the second coil means to ground;

a first rectifier connected at the node between said first impedance means and said first coil means, and a second rectifier connected at the node between said second impedance means and the second coil means; and a differential amplifier connected to the first and second rectifiers to provide output signals representing changes in eddy currents in the symmetrical member caused by limited angular displacement of the shaft member, which output signals are generally linearly related to the angular displacements over a range from about minus fifty degrees (50°) to positive fifty degress from the position at which the sides of the symmetrical member are equally spaced from the first and second coil means.

2. An angular displacement sensor according to claim 1 wherein the symmetrical member is formed from aluminum.

3. An angular displacement sensor according to claim 1 wherein the first and second coil means are helixes located with their axial centerlines aligned with one another.

4. An angular displacement sensor according to claim 1 wherein, said oscillator means provides current alternating at a frequency of about 6 megahertz.

* * * * *